Figure 1:
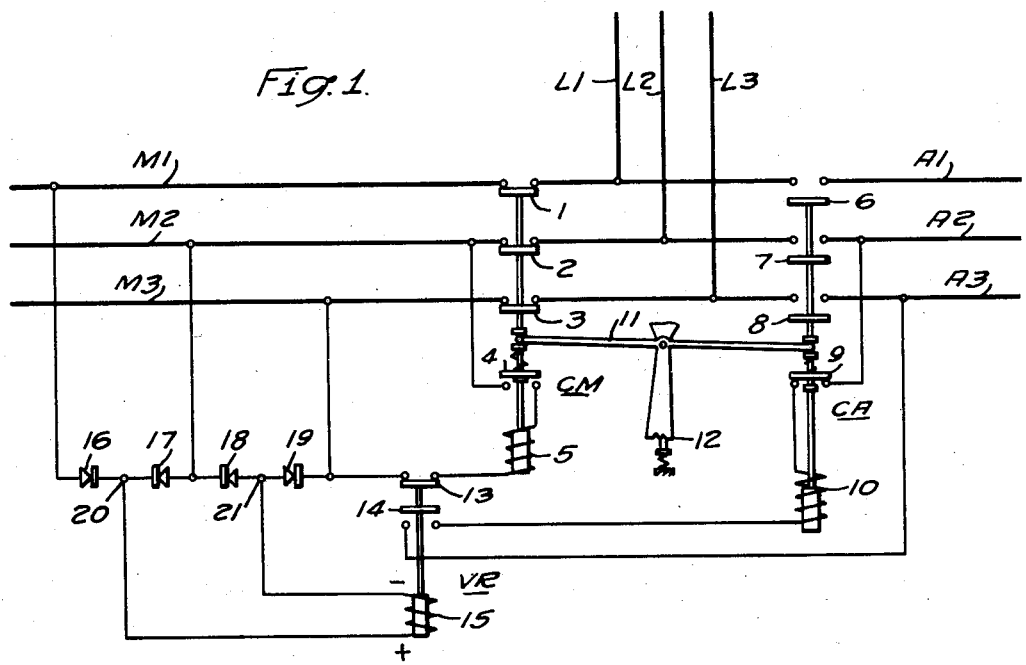

Oct. 25, 1949.　　　　K. MAHNKE　　　　2,486,305

THREE-PHASE TRANSFER RELAY

Filed July 20, 1945

WITNESSES:

INVENTOR
Kurt Mahnke.
BY
Paul E. Friedemann
ATTORNEY

Patented Oct. 25, 1949

2,486,305

UNITED STATES PATENT OFFICE 2,486,305

THREE-PHASE TRANSFER RELAY

Kurt Mahnke, Pittsburgh, Pa., assignor to Westinghouse Electric Corporation, East Pittsburgh, Pa., a corporation of Pennsylvania Application July 20, 1945, Serial No. 606,206

4 Claims. (Cl. 171—97)

My invention relates to automatic bus transfer devices for three-phase alternating-current systems.

Such devices are used in lighting and other electric load circuits for switching the load from a first to a second power supply line—usually from a preferred or main power source to an emergency source—in response to the occurrence of failure or excessive irregularity in the power furnished by the first line.

In known three-phase alternating-current systems, the transfer is controlled by a voltage-sensitive relay whose coil is energized by the combined output current of three full-wave banks of rectifiers, each bank being connected between a different one of the three phases of the first or main supply line. A balanced drop of the three-phase voltage causes the rectified current to drop accordingly. If this drop exceeds a given limit, the relay drops out and transfers the load circuit to the second or emergency source. In the case of failure of only one of the three phases, the rectified voltage is also lowered; and the relay is supposed to then also effect a transfer. In a three-phase rectifier connection of this type, a complete failure of one phase voltage causes a drop of one-third in rectified voltages. Hence, the relay must be so calibrated as to respond safely to a drop in rectified voltage of not more than one-third of normal, so that also in the case of a balanced (i. e. three-phase) voltage drop, the transfer is effected before the line voltage declines to more than about 66% of its normal value. That is, if in the known systems of this kind the transfer control relay is rated for response to a balanced voltage drop to less than 66% of normal line voltage, the device is incapable of responding to unbalanced phase failure.

It is the main object of my invention to provide a bus transfer device for three-phase alternating-current systems which permits a considerable reduction in balanced voltage down to about 50% of normal, without rendering the device incapable of responding to phase failure.

To this end, and in accordance with an essential feature of my invention, I equip the transfer device with two pairs of rectifier units and connect these pairs between only two phases respectively of the three-phase main supply bus, the two rectifier units of each pair being arranged in series opposition to each other and with such a polarity that the midpoint in one pair lies between rectifier terminals of positive polarity while the midpoint in the other pair lies between rectifier terminals of negative polarity. All rectifier units of the transfer device are thus connected in series relation to one another. The coil of the transfer control relay is connected between the two above-mentioned midpoints. The control relay is, preferably, associated with two line contactors that are mechanically interlocked in the manner exemplified by the embodiment represented in the drawing.

Figure 2:
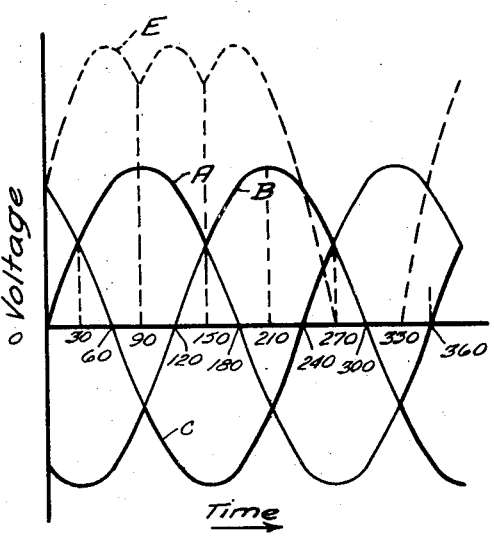

Figure 1 of the drawing is the circuit diagram of a bus transfer system according to the invention; and Fig. 2 is an explanatory diagram representing the condition of the voltage effective across the voltage responsive transfer control relay.

Referring to Fig. 1, the leads L1, L2 and L3 represent the load buses of a three-phase alternating-current system. These buses are to be energized either from the three buses M1, M2 and M3 of a main supply line or from the corresponding buses A1, A2 and A3 of an auxiliary or emergency source. The transfer is effected by means of two contactors denoted by CM and CA, respectively. Contactor CM has three main contacts 1, 2 and 3, which in the illustrated position connect the load buses L1, L2 and L3 to the respective buses M1, M2 and M3 of the main power source. The contacts 1, 2 and 3, as well as an interlock contact 4, are controlled by a coil 5. The contactor CA has three main contacts 6, 7 and 8 for connecting the load buses to the respective buses of the auxiliary supply line. These contacts, as well as an appertaining interlock contact 9, are controlled by a coil 10. The two contactors CM and CA are mechanically interlocked by means of a connecting lever 11 which is associated with a snap action or rest mechanism 12 so as to hold the two contactors CM and CA in the position last adjusted by either coil 5 or coil 10.

A load responsive control relay VR has one contact 13 series connected with coil 5 and another contact 14 series connected with coil 10. When coil 15 of relay VR is sufficiently energized, contact 13 is closed, as illustrated, while contact 14 is open. When relay VR drops out due to an excessive decline of its energizing voltage, contact 13 opens and contact 14 closes. The closure of contact 14 completes an energizing circuit for coil 10 of contactor CA from auxiliary bus A2 through elements 9, 10 and 14 to auxiliary bus A3 so that coil 10 is energized and causes the contacts 1, 2 and 3 to disconnect the load buses from the main buses while closing the contacts 6, 7 and 8 for connection of the load buses to the auxiliary buses A1, A2 and A3. Shortly after the closure of the contacts 6, 7 and 8, the interlock contact 9 opens so that coil 10 becomes deenergized. Due to the arresting action of the interlock mechanism, the contactors will then remain in the new position.

Coil 15 of relay VR is connected to two pairs of rectifiers denoted by 16, 17 and 18, 19, respectively. The rectifiers 16 and 17 are connected in series opposition between mains M1 and M2, and the rectifiers 18 and 19 are connected also in series opposition between mains M2 and M3. The polarity of rectifiers 16 and 17 is so chosen that the midpoint 20 of the series connection lies between electrodes of the same polarity, for instance between the positive electrode of rectifier 16 and the positive electrode of rectifier 17. Rectifiers 18 and 19 are arranged in opposite polarity so that the midpoint 21 is faced by the negative electrodes of the pair. The connection of relay coil 15 extends from midpoint 20 to midpoint 21.

When the three-phase voltage of the main supply line is balanced and of sufficient magnitude, a normal rectified voltage appears between points 20 and 21 and causes the relay VR to stay in the picked up position illustrated in the drawing. When the balanced three-phase voltage declines below a predetermined limit, relay VR drops out and causes a transfer, as described in the foregoing. When the voltage of mains M1, M2 and M3 becomes excessively unbalanced, for instance by voltage failure in one of the phases, the rectified voltage between points 20 and 21 drops also and causes the relay VR to transfer the load buses to the auxiliary buses in the same manner as upon the occurrence of a balanced voltage drop.

When after the occurrence of the above-mentioned transfer the normal conditions of the main supply line are reestablished, relay VR will again pick up and close its contact 13. Since now the contact 4 is closed, an energizing current is passed through the coil 5 and actuates the interlock lever 11. As a result, contactor CA is opened, and contactor CM is returned into the illustrated position thereby interrupting the circuit of coil 5. Thereafter the contacts will remain in the illustrated original position due to the arresting action of the interlock mechanism until a new disturbance occurs in the main supply line.

The rectifiers 16, 17, 18 and 19 may consist of electronic devices or of rectifiers of the so-called contact or junction type.

The operation of the system and the low voltage limit values made available thereby will be more fully understood from the voltage diagram shown in Fig. 2. Assuming for the sake of a simplified explanation that ideal electric rectifiers with zero resistance in one direction and infinite resistance in the opposite direction of current flow are used, the voltage conditions across the rectifiers and across coil 15 of the voltage relay are substantially in accordance with the voltage time curves shown in the diagram. The abscissa of the diagram denotes the time in terms of angular degrees, i. e. 360 degrees correspond to the period of one cycle (1/60 of one second). Rectifier 16 applies to the (+) side of the relay coil 15 (Fig. 1) the potentials of wave A from 0° to 180° (Fig. 2), and rectifier 17 applies potentials B from 120° to 300° to the same side of coil 15. Curve A results in higher potentials than curve B from 120° to 150°, therefore, a current would flow from point 20 to line M2, if it were not blocked by rectifier 17. The potential on point 20 therefore moves to a minimum value of 50% of the crest value at 150°. This is, at 150° curve B takes over from curve A in applying a positive potential to the (+) side of coil 15. Similarly, rectifiers 18 and 19 apply to the (—) side of coil 15 the negative values of curves B and C.

The difference of the respective potentials between the (+) side and the (—) side of the coil, or the effective voltage (curve E), is the difference between the upper heavy-drawn parts of curves A and B on the one hand and the lower heavy-drawn parts of curves B and C on the other hand. During the interval from 240° to 270°, both sides of the coil 15 have positive potentials. As long as the (+) side has a higher potential, the resulting voltage on the coil is positive. At 270°, both sides have the same potential and the resulting coil voltage E becomes zero. Curve E can be shown by an oscilloscope if the (—) side of the coil is taken as a fixed zero point. It will be recognized that the effective voltage impressed through the rectifiers across the relay coil 15 remains zero from 270° to 330°. However, the relay coil represents a highly inductive load. Therefore, the current lags behind the voltage. During the intervals in which voltage E exists, the current builds up gradually. When the value of E has decreased to a point at which it equals the counter-EMF of the relay coil, the current begins to decrease, discharging the magnetic energy stored in the coil 15 through rectifiers 17 and 18, until E has again re-appeared and increased to a point at which it surpasses the counter-EMF. The current will then again increase and restore the lost magnetic energy in the relay coil. Hence, the coil remains continuously energized.

In order to obtain the average D. C. voltage impressed across coil 15, we have to integrate the area of curve E and divide the result by the length of a full cycle (2). This average D. C. voltage amounts to about 90% of the three-phase delta voltage of the main supply line. If the voltage fails in one of the three phases, for instance due to an interruption of one of the buses M1, M2 or M3, the area below the line E is reduced to one-half. Therefore, the rectified voltage across the coil 15 is also reduced to one-half of its normal value, i. e. to about 45% of the three-phase delta voltage.

It thus will be understood that the relay VR or its coil circuit may be adjusted so that the relay drops out in response to a decline in balanced three-phase voltage to about 50% of its rated value without becoming incapable of also responding to unbalance or phase failure of the system.

The above-mentioned ideal conditions are approached by vacuum, gas or vapor filled electronic rectifier tubes. Somewhat different results are obtained when using contact-type rectifiers although the difference does not impair the usefulness of the system especially as regards its application to the customary line voltages.

It will be understood by those skilled in the art that systems as described in the foregoing may be modified as to details—for instance, as regards the design of the transfer contactors, their interlocking connection, or their connection with the voltage responsive relay—without departing from the essence of my invention and within the scope of its essential features as set forth in the claims attached hereto.

I claim as my invention:

1. An automatic device for transferring a load from one to another three-phase alternating-current line, comprising three line terminals, a group of rectifier units all connected in series relation to one another and arranged relative to said terminals so that one pair of units is connected only across two of said terminals while another pair of units is only connected across one of said two terminals and the third terminal, the two units of each pair having respective electrodes of one polarity connected with each other and said polarity in one pair being the opposite of that in the other pair, a circuit extending from a point between the electrodes of one pair to a point between the electrodes of the other pair, relay means connected in said circuit, and switching means controlled by said relay means to transfer the load in response to the occurrence of a given voltage drop across said circuit.

2. A bus transfer device for three-phase alternating-current systems, comprising three load buses, three main power buses, three auxiliary power buses, switching means for selectively connecting said load buses to said main buses and auxiliary buses respectively, relay means for controlling said switching means, a group of rectifier units all connected in series relation to one another and disposed relative to said terminals so that two units are connected in anode-to-anode relation between only two of said main buses, and two other units are connected in cathode-to-cathode relation only between one of said two main buses and the third main bus, said relay means being connected between the anodes of said first two rectifiers and the cathodes of said other two rectifiers for causing said switching means to disconnect said load buses from said main power buses and connect said load buses to said auxiliary buses when the rectified voltage imposed on said relay means drops below a given magnitude.

3. A relay circuit for a three-phase alternating-current line, comprising three line terminals, a pair of rectifiers series-arranged in anode-to-anode connection between only two of said terminals, another pair of rectifiers series-arranged in cathode-to-cathode relation and connected only between one of said two terminals and the third terminal, and a voltage relay connected between the two midpoints of said pairs, respectively, so as to change its relay condition when the rectified voltages between said midpoints reaches a given value.

4. A bus transfer device for three-phase alternating-current systems, comprising three load buses, three main power buses, three auxiliary power buses, a first contactor for connecting said load buses to said main buses, a second contactor for connecting said load buses to said auxiliary buses, interlock means connecting said contactors so as to close one contactor when the other is open, a voltage relay having contact means for controlling said contactors and a coil for causing said contact means to close said first contactor when said coil is excited by a voltage above a given value and to close said second contactor when the coil voltage drops below said value, four rectifier units connected in series relation to one another and arranged relative to said terminals so that two of said units are connected in anode-to-anode relation between only two of said main buses and the two other units are connected in cathode-to-cathode relation only between one of said two main buses and the third main bus, said relay coil being connected between the anodes of said first two units and the cathodes of said other two units.

KURT MAHNKE.

REFERENCES CITED

The following references are of record in the file of this patent:

UNITED STATES PATENTS

| Number | Name | Date |
|---|---|---|
| 2,326,070 | Schaelchlin et al. | Aug. 3, 1943 |